Dec. 17, 1935.   C. A. SAWTELLE   2,024,808
VEHICLE BRAKE
Filed Dec. 30, 1927   2 Sheets-Sheet 1
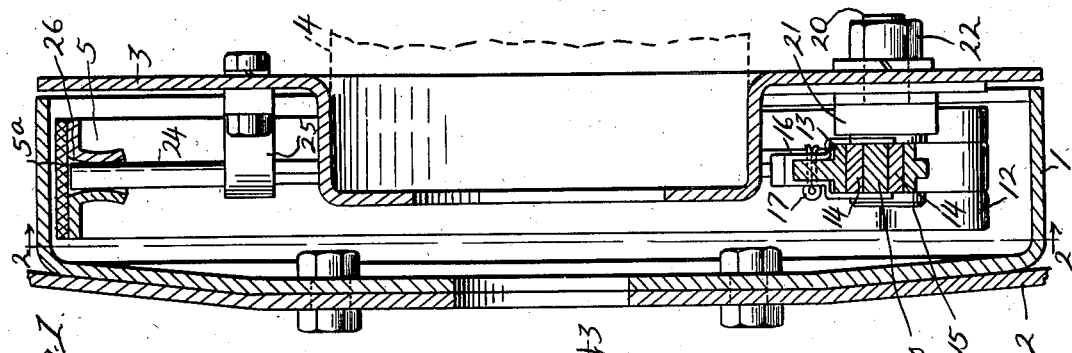
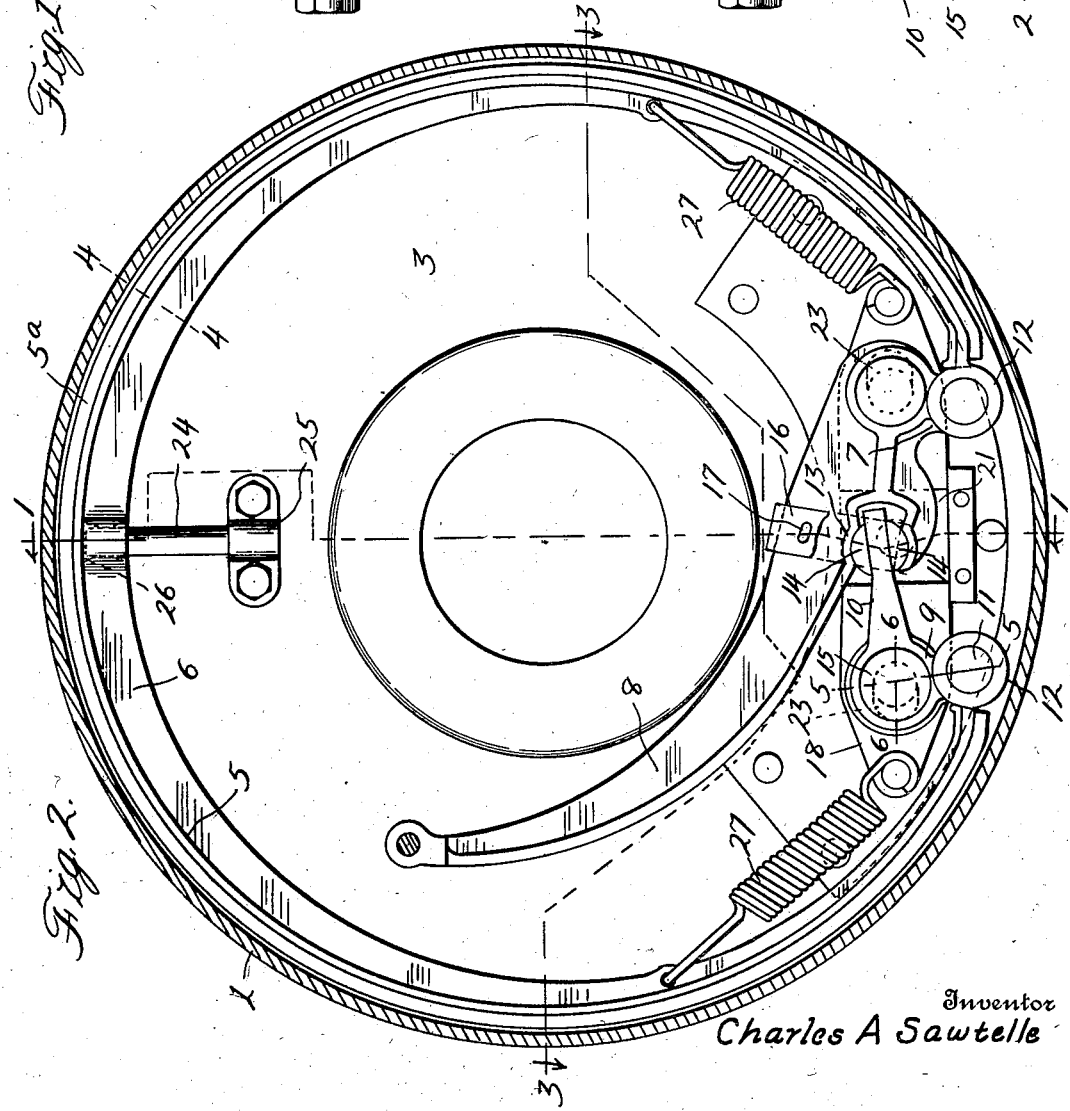
Inventor
Charles A Sawtelle
By Swan, Frye, + Murray
Attorneys Dec. 17, 1935. C. A. SAWTELLE 2,024,808
VEHICLE BRAKE
Filed Dec. 30, 1927 2 Sheets-Sheet 2
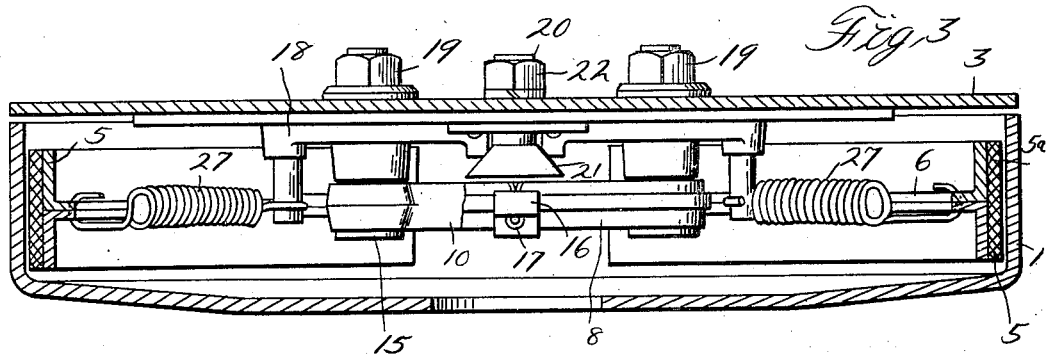
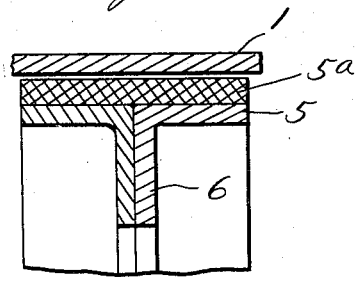
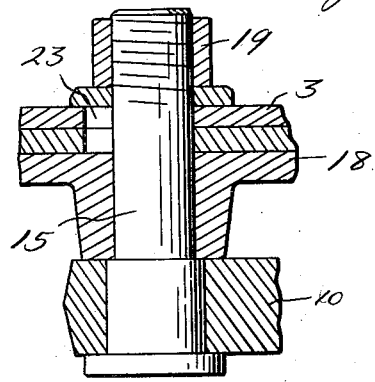
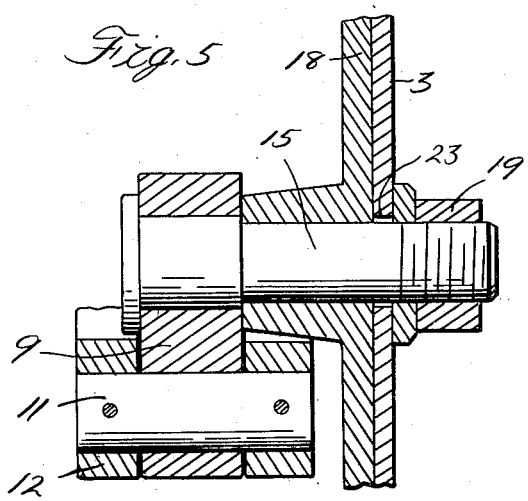
Inventor
Charles A. Sawtelle
By Swan, Frye, & Murray
Attorneys Patented Dec. 17, 1935

2,024,808

UNITED STATES PATENT OFFICE 2,024,808

VEHICLE BRAKE

Charles A. Sawtelle, Detroit, Mich., assignor, by direct and mesne assignments, to S. and D. Engineering Company, Detroit, Mich., a corporation of Michigan Application December 30, 1927, Serial No. 243,529

15 Claims. (Cl. 188—78)

This invention relates to vehicle brakes and particularly to vehicle brakes in which the retarding or arresting force is internally applied to a brake drum.

An object of the invention is to eliminate servo or wrapping effects and the resulting uncertainty of operation and decreased completeness of control.

Another object is to provide for internal engagement of a brake drum by a single flexible band and to taper said band, as regards its radial dimension, from its center portion to its ends thereby rendering the center portion relatively stiff and gradually increasing the flexibility of the band from its mid-portion to its ends, whereby the application of an equalized expanding force to the ends of the brakes results in a substantially uniform exercise of braking force by the band, throughout its circumference.

A further object is to resiliently anchor the midportion of a brake band, and particularly one having varying flexibility, as described, so as to permit a slight circumferential play of said portion of the band responsive to a braking control, while insuring return of said portion of the band to its normal position upon cessation of such control.

Still another object is to associate with a mechanism for applying an equalized expansive force to the ends of a brake band, an improved adjustment means to compensate for wear of such band.

These and various other objects the invention attains by the construction hereinafter described and illustrated in the accompanying drawings, wherein Fig. 1 is a view in vertical cross-section of the herein described brake mechanism, taken upon the line 1—1 of Fig. 2.

Fig. 2 is a sectional elevational view of said mechanism, taken upon the line 2—2 of Fig. 1.

Fig. 3 is a view of said mechanism in horizontal cross-section taken upon the line 3—3 of Fig. 2.

Fig. 4 is a cross-section of the band taken on line 4—4 of Fig. 2.

Fig. 5 is a vertical cross-section on line 5—5 of Fig. 2 showing the mounting of one of the bell cranks which actuate the band.

Fig. 6 is a horizontal sectional view of the same.

In these views, the reference character 1 designates a brake drum of ordinary construction, which may be secured to a wheel, partially shown at 2, and with which is associated the usual nonrotative carrier plate (or dust cover) 3, attached, as is customary, to a member 4 carried by or forming a part of the axle.

A brake-band 5, to which the usual lining 5a is applied, is interiorly engageable with the drum 1, throughout a major portion of the circumference of said drum. Said band is gradually increased in flexibility from its midportion to its extremities, preferably by forming said band, for substantially its entire circumferential extent, with an internal radial rib 6, the radial dimension of which is gradually reduced from the center to the ends of the band. As illustrated, the band 5 comprises a pair of duplicate sheet metal stampings having inwardly projecting flanges, spotwelded together or otherwise suitably rigidly connected to form the rib 6.

The ends of the band 5 are engaged by a mechanism for applying an equalized braking force to said ends. Thus, a pair of bell-crank levers 7, 8 and 9, 10 have their short arms, 7 and 9, pivoted to pins 11 engaging in eyelets 12 formed respectively integrally with the ends of the band and have their long arms 8 and 10 connected for actuation in unison. Thus, the arm 8, which is relatively long and may be terminally engaged by any suitable actuating mechanism, is formed with a socket 13, into which the arm 10 projects and in said socket a two part member 14 slidably engaged by the arm 10 is journaled to rock with the arm 10 and to actuate said arm from the arm 8. The member 14 is located substantially equidistantly from the fulcrum pins 15 of the two bell-cranks, and slightly above the common centre-line of said pins so as to effect a substantial equalization of the braking forces transmitted through said bell-cranks. The segments comprising the pivot 14 are held in the socket 13 by a sheet-metal retainer 16, one end portion of which embraces the arm 8 and is suitably secured to said arm, as for example, by a cotter-pin 17. The pins 15 on which the bell cranks are fulcrumed, are carried by a pair of mounting plates 18, which are clamped to the carrier plate 3 by nuts 19 engaging the outer ends of said pins.

To provide in a simple manner for adjustment of the described brake mechanism to compensate for wear of the lining 5a, a bolt 20 is engaged with the carrier plate between the plates 18 and is provided between said plates with a head 21 having reversely beveled opposite edges engaging corresponding bevels upon said plates. A nut 22 engaging the bolt 20 and seating against the outer face of the carrier plate, may be turned to feed the head of said bolt gradually toward the carrier plate to shift from each other the plates 18 and the bell cranks journaled thereupon, thus reducing the clearance between the brake band and drum. The attachment of the plates 18 to the carrier plate by the pins 15 permits of the described relative adjustment of the plates 18, since the slots 23 formed in the carrier plate to receive said pins are sufficiently elongated to allow said pins 15 to be adjusted in unison with the plates 18.

Substantially midway between its ends, the band 5 is engaged by a flexible anchorage member, which preferably has the nature of a rod 24 of spring steel, radially disposed within the drum 1 and rigidly mounted at its inner end in a bracket 25 secured to the carrier plate. The outer end portion of said rod fits slidably in a radial opening 26 which opening is preferably flared inwardly and outwardly from its midportion to avoid binding in said opening of the rod 24, when flexed. As illustrated, the opening 26 is formed between the two stampings of which the band 5 is comprised.

A pair of coiled springs 27 are extended between the band 5 and the plates 18, tending to normally retract the band from the drum.

In the use of the described brake, when the arm 8 is downwardly rocked, the arm 10 is correspondingly actuated owing to its engagement with the pivot element 14. The arms 7 and 9 are thus rocked from each other, spreading apart the ends of the band 5, under a substantially equalized effort. The mid-portion of the band is adapted to engage or disengage the drum by a slight outward or inward sliding. The pins 15 primarily transmit to the carrier plate the torque stress to which the band is subjected when the brake is applied, thus functioning as paired anchorage elements. When wear results between said pins and the bell cranks, the resulting lost motion may allow a slight rotational travel of the band under braking conditions and it is to permit of such a travel that the anchorage rod 24 is of a slightly flexible nature.

In adjusting for wear of the brake band lining, the nuts 19 are loosened sufficiently to allow the mounting plates 18 to be forced apart, and the nut 22 is then turned to effect such an outward adjustment of the bolt 20 as will act through the head of said bolt to effect the desired increased spacing of the plates 18 and of the bell cranks which they carry.

By gradually varying the flexibility of the band 5 in the described manner, it becomes possible to give the band sufficient stiffness throughout its circumference to avoid any risk of buckling, and to assure a full utilization of all the working surface of said band. Also the increased stiffness resulting from the described construction is an important factor in eliminating any servo or wrapping effect, so that a full braking control may be exercised.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

With respect to the described feature of varying the flexibility of the brake band 5, 6, it is important to note that by virtue of this feature, said band very closely maintains a circular form at all times so that its entire lined face is adapted to become instantly fully effective upon the brake drum, when control is exercised. Such a band peculiarly lends itself to actuation by mechanism of the illustrated type, which is eliminative of servo or wrapping effects. A band of uniform flexibility is not well suited for internal use even with a control mechanism of the illustrated type, since such a band would tend to buckle unless provided with at least several guides and reinforcements and would be unlikely to act upon the band uniformly throughout its working face. Also because of the constant circular form of the band, the normal necessary clearance between the drum and band is minimized and may be maintained a minimum throughout the useful life of the brake lining.

What I claim is:

1. The combination with a brake drum, and a carrier plate closing one side of said drum, of a flexible band interiorly engageable with said drum and gradually increased in flexibility from its mid-portion to its ends, a flexible rod disposed substantially radially within said drum, attached to said carrier plate at its inner end, and having its outer portion slidably engaged with the mid-portion of said band, and means for expanding the band engaging the ends thereof.

2. The combination with a brake drum, and a carrier plate closing one side of said drum, of a brake member interiorly frictionally engageable with said drum, a pair of actuating elements for said brake member, pivoted upon said carrier plate and connected for actuation in common, and adjustable from each other upon the carrier plate, and a wedge member within said drum, adjustable to and from the carrier plate and adapted to spread upon said actuating elements.

3. A brake mechanism comprising a brake drum, a brake band interiorly engageable with said drum, a pivoted lever operatively connected to one end of said band, a second lever operatively connected to the other end of said band, and formed with a socket into which the first named lever projects and the member journaled in said socket to turn about an axis parallel to those of said levers, and slidably engaged by the first named lever.

4. A brake mechanism comprising a brake drum, a brake band interiorly engageable with said drum, a pair of bell crank levers pivoted within the drum and connected one to each end of said band, means for adjusting said bell crank levers from each other to compensate for wear of the band, and means maintaining an actuating connection from one of said levers to the other in all positions of such adjustment.

5. A brake mechanism comprising a brake drum, a flexible brake band interiorly engageable with said drum and having its flexibility gradually increased from its mid-portion to its end portions, a pair of bell crank members, each having an arm engaging an end of said band and having their other arms engaging for actuation in common, and fixed pivots for said bell cranks.

6. The combination with a brake drum, of a flexible band interiorly engageable with said drum and gradually increased in flexibility from its mid portion to its end portions, a flexible rod radially disposed within the drum and having its outer end slidably engaged with the mid-portion of said band, means for holding the other extremity of said rod stationary with respect to the drum, and means for expanding the band engaging the ends thereof.

7. The combination with a brake drum and a carrier plate closing one side of said drum, of a flexible band interiorly engageable with said drum and gradually increased in flexibility from its mid portion to its ends, means for expanding the band engaging the ends thereof, and a connection between the mid portion of said band and the carrier plate flexible to afford the band a limited radial and circumferential travel.

8. A brake comprising a drum, an internal cooperating expanding band, bell cranks operatively connected to the end portions of the band, means for actuating the bell cranks, and means for shifting the pivot point of a bell crank.

9. The combination with a brake drum, and means interiorly frictionally engageable with the drum comprising spaced end portions, of a pair of bell cranks operatively connected to said end portions, pivot members mounting said bell cranks, a common means for rocking said bell cranks, and a common means for adjusting said pivot members apart.

10. The combination with a brake drum and a carrier plate closing one side of the drum, and means interiorly frictionally engageable with the drum comprising spaced end portions, of a pair of actuating elements for the last named means each operative upon one of said end portions, mechanism for operating said actuating elements in common, and mechanism mounted upon the carrier plate between the pivots of said actuating elements for adjusting said elements away from each other in common.

11. The combination with a brake drum and means interiorly frictionally engageable with the drum comprising spaced end portions, of a pair of bell cranks operatively connected to said end portions, pivot members mounting said bell cranks, a common means for rocking said bell cranks, and a wedge member acting upon one of said pivot members to vary its spaced relation to the other pivot member.

12. A brake comprising a brake drum and a carrier plate closing one side of the drum, means for interiorly applying friction to the drum, said means having circumferentially spaced ends, a pair of levers connected to said ends, means for actuating the levers in common to apply the brake, a pair of circumferentially spaced supports on which the levers are individually pivoted, said supports being adjustable to and from each other on the carrier plate to compensate for wear of the friction-applying means, and means on the carrier plate for adjusting said supports, in common.

13. A brake comprising a brake drum, means for interiorly applying friction to the drum, said means having circumferentially spaced ends, a pair of levers connected to said ends, means for actuating the levers in common to apply the brake, a pair of circumferentially spaced supports on which the levers are individually pivoted, said supports being adjustable to and from each other to increase the spacing of the levers and thereby compensate for wear of the friction-applying means, and a member interposed between said supports effective on both thereof to adjust them from each other.

14. In a brake, as set forth in claim 13, means associated with each of said supports for securing it in a selective adjustment.

15. A brake comprising a drum, means for interiorly applying friction to the drum, a lever for actuating said means, a pin forming a fulcrum for the lever, a support for the pin, a plate on which the support is adjustable to vary the position of the lever and thereby compensate for wear of the friction means, said plate being slotted to accommodate the pin, and means coacting with the pin to clamp the support on the plate in a selective position of said adjustment.

CHARLES A. SAWTELLE.